US012759631B2

(12) United States Patent
Daiyakuji et al.

(10) Patent No.: US 12,759,631 B2
(45) Date of Patent: Oct. 13, 2026

(54) ELECTRIC CRAWLER VEHICLE

(71) Applicants: Yanmar Holdings Co., Ltd., Osaka (JP); Toyota Jidosha Kabushiki Kaisha, Toyota (JP)

(72) Inventors: Taihei Daiyakuji, Okayama (JP); Yusuke Hashimoto, Okayama (JP); Masashi Matsumoto, Toyota (JP)

(73) Assignees: YANMAR HOLDINGS CO., LTD., Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/826,071

(22) Filed: Sep. 5, 2024

(65) Prior Publication Data

US 2025/0074508 A1 Mar. 6, 2025

(30) Foreign Application Priority Data

Sep. 6, 2023 (JP) ................................ 2023-144380

(51) Int. Cl.
*B62D 11/16* (2006.01)
*B60K 17/28* (2006.01)

(52) U.S. Cl.
CPC .............. *B62D 11/16* (2013.01); *B60K 17/28* (2013.01)

(58) Field of Classification Search
CPC .............................. B60K 17/046; B62D 11/16
See application file for complete search history.

(56) References Cited

U.S. PATENT DOCUMENTS

| | | | | |
|---|---|---|---|---|
| 1,991,094 | A * | 2/1935 | Higley | H02P 9/06 475/152 |
| 4,428,445 | A * | 1/1984 | Zaunberger | B62D 11/18 180/6.44 |
| 4,998,591 | A * | 3/1991 | Zaunberger | B62D 11/10 180/6.7 |
| 5,195,600 | A * | 3/1993 | Dorgan | F16H 47/04 180/9.1 |
| 7,326,141 | B2 * | 2/2008 | Lyons | B62D 11/16 180/6.7 |
| 7,410,437 | B2 * | 8/2008 | Garnett | F16H 3/727 475/5 |
| 7,497,796 | B2 * | 3/2009 | Ordo | B62D 11/16 475/5 |

(Continued)

FOREIGN PATENT DOCUMENTS

| | | |
|---|---|---|
| CN | 102649394 A | 8/2012 |
| DE | 644547 C | 5/1937 |

(Continued)

OTHER PUBLICATIONS

The extended European Search Report dated Feb. 14, 2025, issued in EP Patent Application No. 24198564.7.

*Primary Examiner* — Stacey A Fluhart
(74) *Attorney, Agent, or Firm* — NORTON ROSE FULBRIGHT US LLP

(57) ABSTRACT

An electric crawler vehicle includes a pair of left and right traveling crawlers, a traveling electric motor that generates traveling power to be transmitted to the pair of left and right traveling crawlers, and a turning electric motor that generates turning power to be transmitted to the pair of left and right traveling crawlers. The traveling electric motor and the turning electric motor are disposed on one lateral side of the vehicle.

5 Claims, 8 Drawing Sheets

(56) References Cited

U.S. PATENT DOCUMENTS

| | | | | |
|---|---|---|---|---|
| 7,621,354 | B2 * | 11/2009 | Witzenberger | B60L 15/2054 180/9.1 |
| 8,672,790 | B2 * | 3/2014 | Severinsson | F16H 48/36 475/5 |
| 9,219,393 | B2 * | 12/2015 | Karlsson | H02K 7/006 |
| 9,862,260 | B2 * | 1/2018 | Lee | B60K 6/387 |
| 12,214,821 | B2 * | 2/2025 | Thompson | B62D 11/16 |
| 2007/0049439 | A1 | 3/2007 | Garnett | |
| 2023/0039208 | A1 | 2/2023 | Thompson et al. | |
| 2024/0262206 | A1 * | 8/2024 | Hosozawa | B60L 1/00 |

FOREIGN PATENT DOCUMENTS

| | | | | |
|---|---|---|---|---|
| JP | 2001-271317 | A | | 10/2001 |
| JP | 2005013239 | A | * | 1/2005 |
| JP | 2013193469 | A | * | 9/2013 |
| JP | 2017105385 | A | | 6/2017 |

* cited by examiner

ELECTRIC CRAWLER VEHICLE

CROSS-REFERENCE TO RELATED APPLICATION

This application claims priority under 35 U.S.C. § 119 to Japanese Patent Application No. JP2023-144380, filed on Sep. 6, 2023, the entire contents of which are hereby incorporated by reference in their entireties.

TECHNICAL FIELD

The present invention relates to an electric crawler vehicle.

BACKGROUND ART

Conventionally, such an art has been proposed that left and right traveling crawlers are independently moved by left and right electric motors, respectively (see, for example, Patent Document 1).

PRIOR ART DOCUMENT

Patent Document

Patent Document 1: Japanese Unexamined Patent Publication No. 2001-271317

SUMMARY OF INVENTION

Technical Problem

In the configuration of Patent Document 1, left and right electric motors are disposed on both sides (right side and left side) of a vehicle. With this configuration, when maintenance of each electric motor and assembling to the vehicle are performed, it is necessary to disassemble or remove traveling crawlers on both sides and to perform the work from both sides. Thus, it is not easy to perform the maintenance of each electric motor and the assembling to the vehicle.

Further, in the configuration in which the electric motors are disposed in the left-right direction, at least an axial dimension of each of the two electric motors needs to be considered as a width of the drive unit. That is, the width of the drive unit includes a width corresponding to the sum of the axial dimensions of the two electric motors. Therefore, in the crawler vehicle including the aforementioned drive unit, there is a limitation in setting of an inter-center dimension (tread) between the left and right traveling crawlers. As a result, there is a concern that the number of operations that can be performed is reduced. For example, depending on an agricultural work, the tread needs to be set narrow, but in the configuration in which the electric motors are aligned in the left-right direction, the tread becomes wider, and predetermined agricultural work cannot be coped with any more in some cases.

The present invention was made in order to solve the aforementioned problems, and an object thereof is to provide an electric crawler vehicle capable of facilitating works of the maintenance of a plurality of electric motors and assembling to the vehicle and of improving a degree of freedom in setting a tread.

Solution to Problem

An electric crawler vehicle according to one aspect of the present invention includes a pair of left and right traveling crawlers, a traveling electric motor that generates traveling power to be transmitted to the pair of left and right traveling crawlers, and a turning electric motor that generates turning power to be transmitted to the pair of left and right traveling crawlers, and the traveling electric motor and the turning electric motor are disposed on one lateral side of the vehicle.

Advantageous Effects of Invention

According to the aforementioned configuration, the works of the maintenance of the plurality of electric motors (the traveling electric motor and the turning electric motor) and of the assembling to the vehicle can be facilitated, and the degree of freedom in setting the tread can be improved.

DESCRIPTION OF EMBODIMENTS

An embodiment of the present invention will be described below with reference to the drawings.

1. Configuration of Electric Crawler Vehicle

Figure 1:
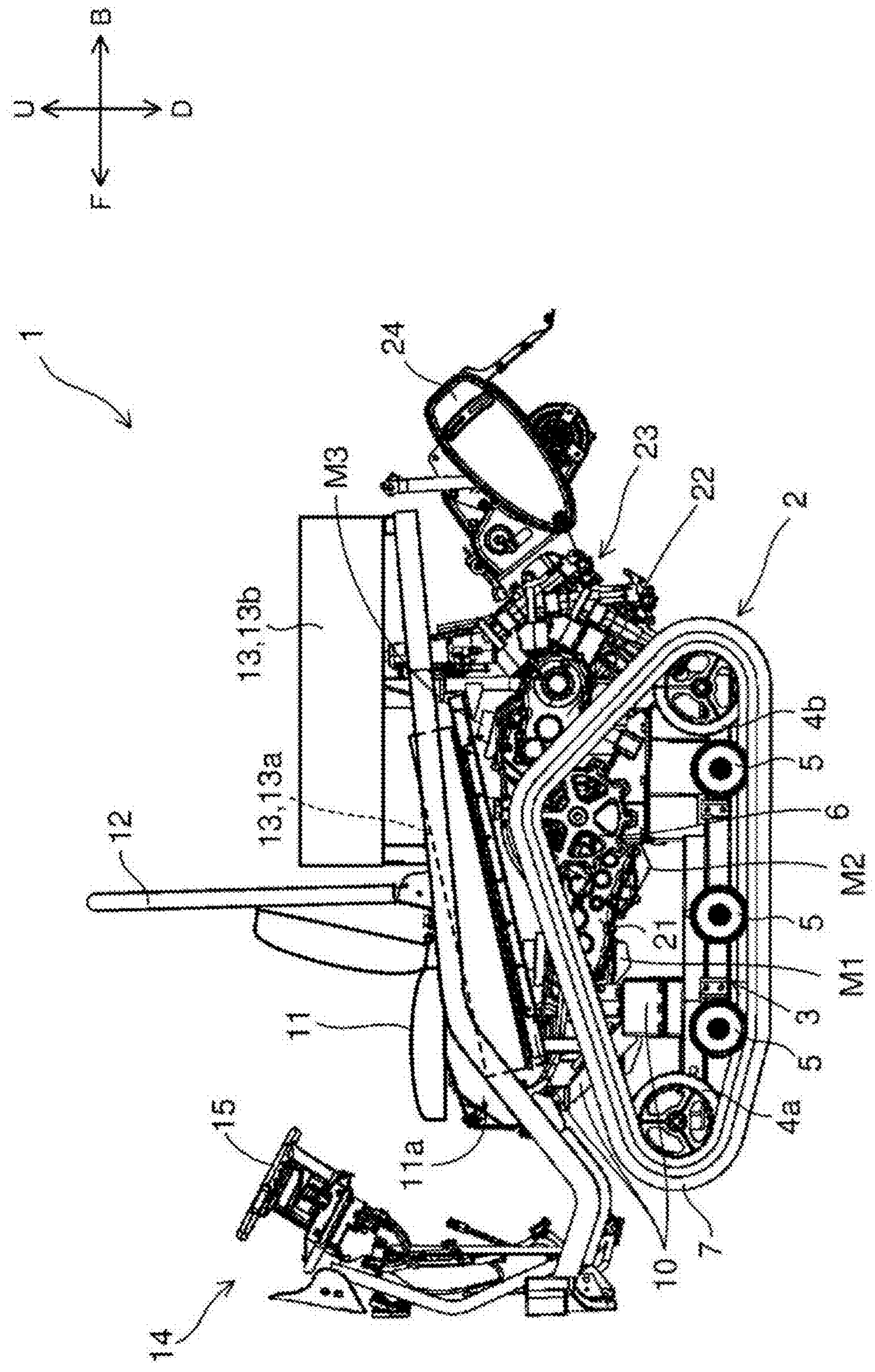
FIG. 1 is a left side view illustrating a schematic configuration of an electric crawler, which is an example of an electric crawler vehicle according to an embodiment of the present invention.
Figure 2:
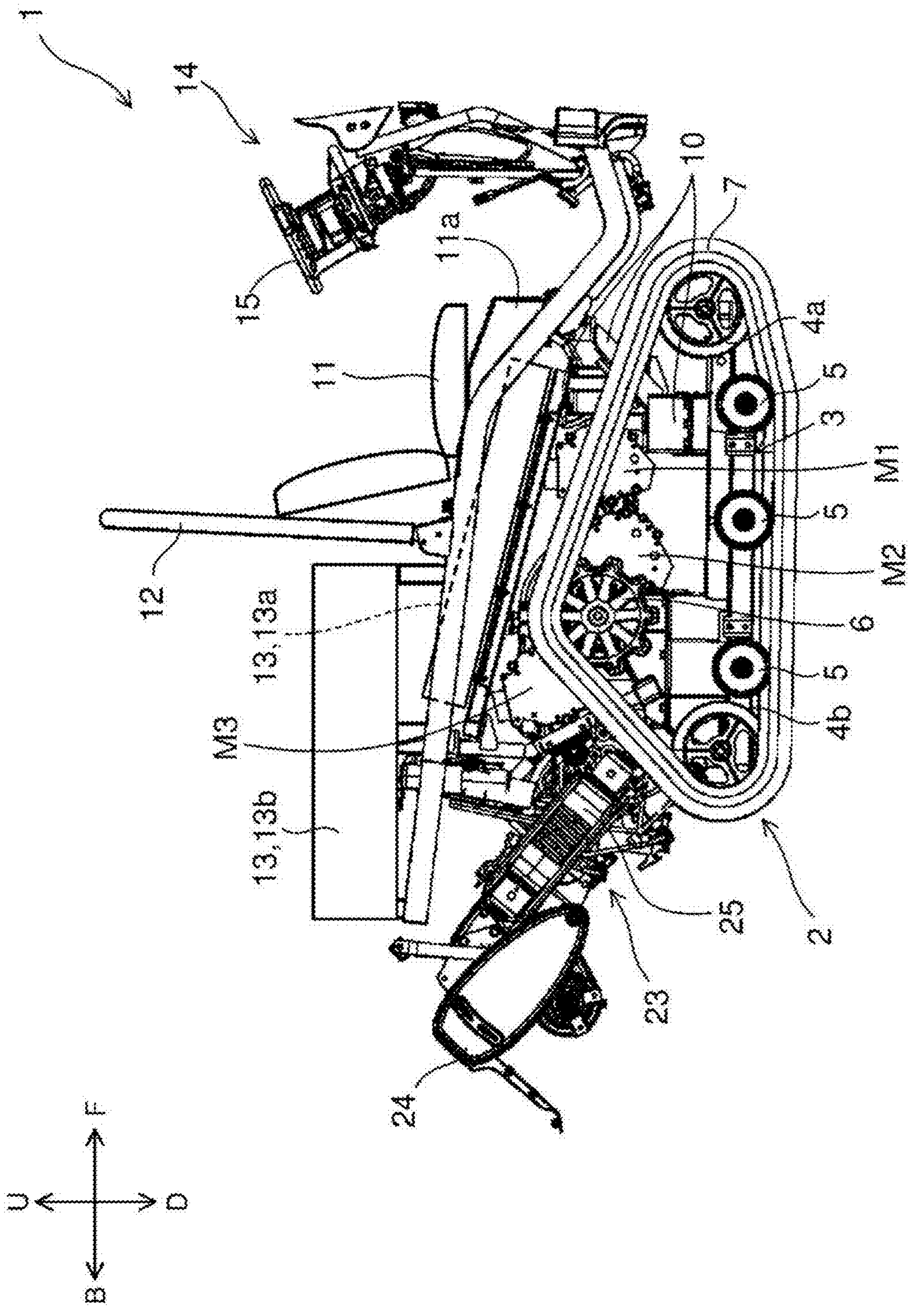
FIG. 2 is a right side view illustrating a schematic configuration of the aforementioned electric crawler.

FIG. 1 is a left side view illustrating a schematic configuration of an electric crawler 1, which is an example of an electric crawler vehicle of this Embodiment. FIG. 2 is a right side view illustrating a schematic configuration of the electric crawler 1. Note that the electric crawler 1 may be simply referred to as a vehicle in the following.

Here, for convenience of the explanation below, directions are defined as follows. A direction in which an operator (manipulator, driver) seated on a driver's seat 11 of the electric crawler 1 faces forward is defined as a front, and a direction opposite thereto is defined as a rear. Moreover, the left side as viewed from the operator seated on the driver's seat 11 is referred to as "left" and the right side as "right", respectively. Further, a gravity direction perpendicular to a front-rear direction and a left-right direction is defined as an up-down direction, an upstream side in the gravity direction is defined as "up", and a downstream side is defined as "down". In the drawings, when necessary, forward is denoted by a symbol "F", backward by "B", rightward by "R", leftward by "L", upward by "U", and downward by "D".

As shown in FIGS. 1 and 2, the electric crawler 1 is a crawler type tractor including traveling crawlers 2 on left and right. Each of the traveling crawlers 2 includes a track frame 3 extending in the front-rear direction. On a front end part of the track frame 3, a front-side idler 4*a* is rotatably supported, and on a rear end part, a rear-side idler 4*b* is rotatably supported. In the track frame 3, a plurality of rolling wheels 5 are rotatably supported between the front-side idler 4*a* and the rear-side idler 4*b*. On diagonally upper front of the rear-side idler 4*b*, a drive sprocket 6 is disposed as a drive wheel. A crawler belt 7 is wound around the drive sprocket 6, the front-side idler 4*a*, the rear-side idler 4*b*, and the plurality of rolling wheels 5 to constitute the traveling crawler 2. As described above, the electric crawler 1 includes a pair of left and right traveling crawlers 2, each having a drive wheel (drive sprocket 6).

The electric crawler 1 includes a main body frame 10. The aforementioned track frame 3 is positioned below a main body frame 10 and is connected to the main body frame 10. The driver's seat 11 is disposed above the main body frame 10 via a seat mount 11*a*. A safety frame 12 is erected on the rear of the driver's seat 11. A first battery unit 13*a* is disposed in a space between the main body frame 10 and the driver's seat 11. Further, a second battery unit 13*b* is disposed above the main body frame 10 and on the rear of the safety frame 12. Electronic components (not shown) such as a system controller 56 (see FIG. 6) to be described later are disposed above the second battery unit 13*b*. Note that the first battery unit 13*a* and the second battery unit 13*b* are collectively referred to also as a battery unit 13 below.

A floor (not shown) is provided on the front below the driver's seat 11. The floor is supported by the main body frame 10. A steering unit 14 is provided on the front side of the floor. In the steering unit 14, in addition to a steering wheel 15 for turning the vehicle, a lever for switching between forward and backward movement of the vehicle, a Power Take Off (PTO) switching lever, a brake pedal, and the like are provided.

Figure 3:
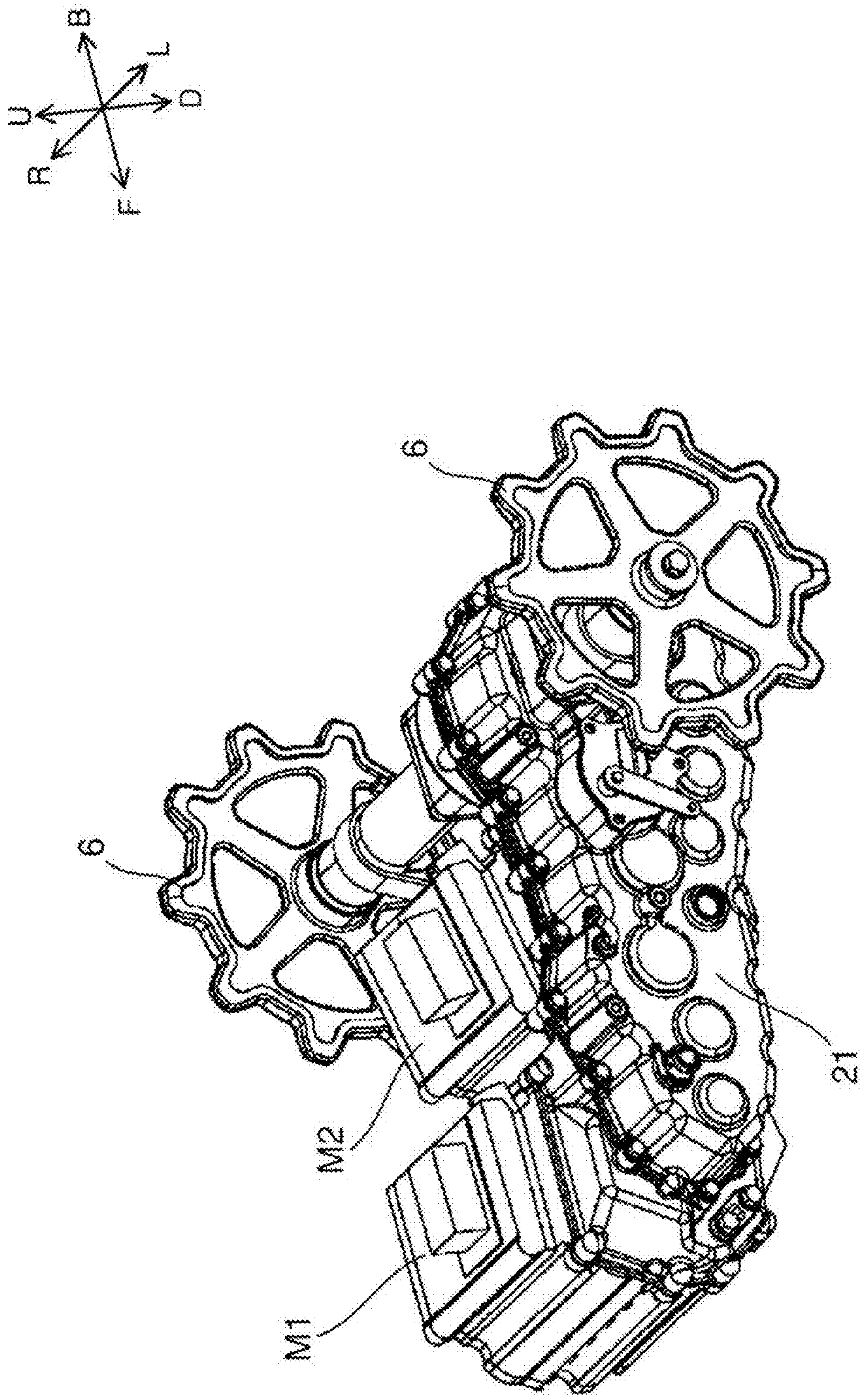
FIG. 3 is a perspective view of a first speed reducer included in the aforementioned electric crawler.
Figure 4:
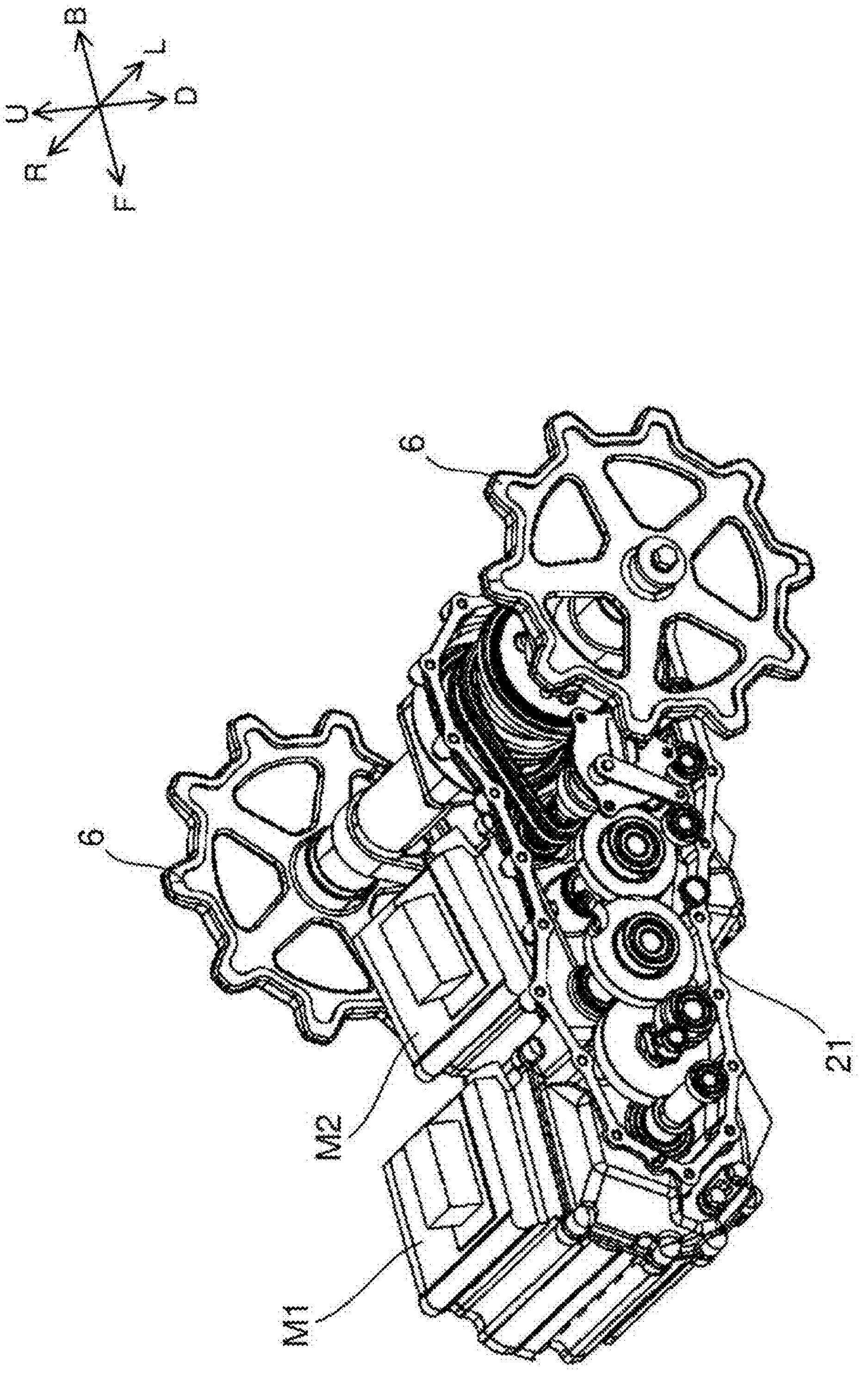
FIG. 4 is a perspective view of an inside of the first speed reducer.

A first speed reducer 21 is disposed between the pair of left and right traveling crawlers 2. FIG. 3 is a perspective view of the first speed reducer 21. FIG. 4 is a perspective view of an inside of the first speed reducer 21. A traveling electric motor M1 and a turning electric motor M2 are connected to the first speed reducer 21. The traveling electric motor M1 is positioned on the front of the turning electric motor M2. A plurality of gears and chains or belts are provided between the drive shaft of the traveling electric motor M1 and the drive shafts of the left and right traveling crawlers 2. The traveling power generated by the traveling electric motor M1 is transmitted to the drive shafts of the left and right traveling crawlers 2 by the plurality of gears and the chain or the belt. Further, the plurality of gears are provided between the drive shaft of the turning electric motor M2 and the drive shafts of the left and right traveling crawlers 2, and turning power generated by the turning electric motor M2 is transmitted to the drive shafts of the left and right traveling crawlers 2 by the plurality of gears. The aforementioned drive sprockets 6 are provided at both left and right ends of the drive shafts of the left and right traveling crawlers 2. The drive sprocket 6 is rotated by the traveling power or the turning power transmitted to the drive shaft, whereby the left and right traveling crawlers 2 are rotated, and the electric crawler 1 travels or turns. The electric crawler 1 includes a differential mechanism 30 (see FIG. 5), and details of the differential mechanism 30 will be described later.

From the above, it can be said that the electric crawler 1 of this Embodiment includes the traveling electric motor M1 that generates traveling power to be transmitted to the pair of left and right traveling crawlers 2, and the turning electric motor M2 that generates turning power to be transmitted to the pair of left and right traveling crawlers 2.

The PTO electric motor M3 is supported on the rear part of the main body frame 10 shown in FIGS. 1 and 2. The PTO electric motor M3 generates PTO power for driving the work machine 24. The work machine 24 is connected to a rear part of the main body frame 10 via a two-point or three-point link-type elevating device 23. The work machine 24 is constituted by, for example, a tilling work machine (for example, a rotary tilling machine or a plow), but may be other work machines such as a fertilizing device.

The PTO electric motor M3 is connected to a second speed reducer 22 having a plurality of gears therein.

That is, the second speed reducer 22 is a PTO speed reducer to which the PTO electric motor M3 is assembled. The second speed reducer 22 and the work machine 24 are connected to each other via a PTO power transmission unit 25 (see FIG. 2). The work machine 24 can be driven by transmitting the power of the PTO electric motor M3 to the work machine 24 via the second speed reducer 22 and the PTO power transmission unit 25.

2. Differential Mechanism

Figure 5:
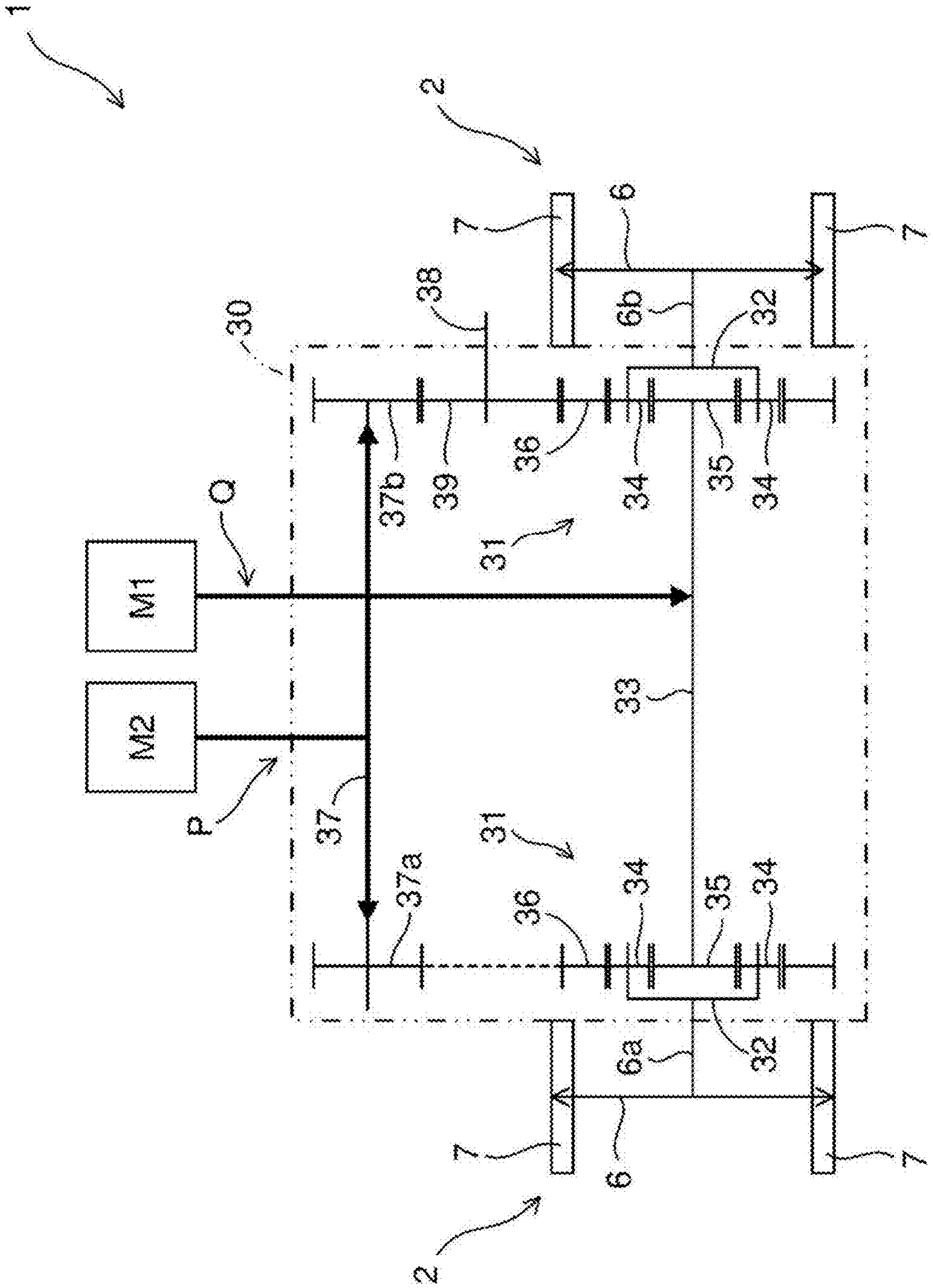
FIG. 5 is an explanatory view schematically illustrating a configuration of a differential mechanism included in the aforementioned electric crawler.

FIG. 5 is an explanatory view schematically illustrating a configuration of a differential mechanism 30 included in the electric crawler 1. The differential mechanism 30 is disposed in a turning power transmission unit P (power transmission path) between the turning electric motor M2 and each drive wheel (drive sprocket 6) of the pair of left and right traveling crawlers 2.

The differential mechanism 30 includes a pair of left and right planetary transmission mechanisms 31. The planetary transmission mechanisms 31 are disposed symmetrically. Each planetary transmission mechanism 31 has a planetary carrier 32, respectively. The left and right planetary carriers 32 are rotatably disposed in the first speed reducer 21 (see FIG. 4) such that a sun shaft 33 extending in the left-right direction and a center axis (rotating shaft) are located coaxially. The center axis of the left-side planetary carrier 32 is connected to the drive shaft 6*a* of a drive wheel (drive sprocket 6) of the left-side traveling crawler 2. The center axis of the right-side planetary carrier 32 is connected to the drive shaft 6*b* of the drive wheel (drive sprocket 6) of the right-side traveling crawler 2.

Each of the left and right planetary transmission mechanisms 31 has a plurality of (for example, three) planetary gears 34. In the left-side planetary transmission mechanism 31, each of the plurality of planetary gears 34 is rotatably supported by the left-side planetary carrier 32. In the right-side planetary transmission mechanism 31, each of the plurality of planetary gears 34 is rotatably supported by the right-side planetary carrier 32. In each planetary transmission mechanism 31, the plurality of planetary gears 34 are positioned with the same radius around the sun shaft 33 and are disposed so as to mesh with sun gears 35 fixed to both left and right ends of the sun shaft 33, respectively.

In the left and right planetary transmission mechanisms 31, a ring gear 36 is disposed concentrically with the aforementioned sun shaft 33. Each ring gear 36 has internal teeth on its inner peripheral surface and external teeth on its outer peripheral surface. The ring gear 36 of the left-side planetary transmission mechanism 31 is disposed such that the internal teeth thereof mesh with the plurality of left-side planetary gears 34. The ring gear 36 of the right-side planetary transmission mechanism 31 is disposed such that the internal teeth thereof mesh with the plurality of right-side planetary gears 34. Each of the ring gears 36 is rotatably supported on the sun shaft 33 or on the drive shafts 6*a* and 6*b* via bearings.

When the turning electric motor M2 is rotated, the rotational power (turning power) of the turning electric motor M2 is transmitted to the left-side drive shaft 6*a* and the right-side drive shaft 6*b* via the turning power transmission unit P. More specifically, the turning power of the turning electric motor M2 is transmitted to transmission gears 37*a* and 37*b* attached to both the left and right ends of a motor-output shaft 37.

Here, the left-side transmission gear 37*a* is disposed so as to directly mesh with external teeth of the left-side ring gear 36. On the other hand, the right-side transmission gear 37*b* is disposed so as to mesh with a reverse gear 39 attached to a reversing shaft 38. This reverse gear 39 is disposed so as to mesh with the outer teeth of the right-side ring gear 36.

For example, in a state where the rotation of the traveling electric motor M1 is stopped, the sun shaft 33 and the sun gears 35 on both the left and right sides are fixed. Therefore, when the turning electric motor M2 (motor-output shaft 37) is rotated in the forward direction, the left-side ring gear 36 rotates in the reverse direction by a predetermined number of rotations (rotational speed), and the right-side ring gear 36 rotates in the forward direction at the same number of rotations as the left-side ring gear 36. Thus, the planetary gear 34 and the planetary carrier 32 on the left side rotate reversely about the sun shaft 33, while the planetary gear 34 and the planetary carrier 32 on the right side rotate forward about the sun shaft 33. Therefore, the drive shaft 6*a* coaxial with the left-side planetary carrier 32 rotates in the reverse direction, while the drive shaft 6*b* coaxial with the right-side planetary carrier 32 rotates in the forward direction. Thus, the left-side traveling crawler 2 moves backward, and the right-side traveling crawler 2 moves forward. In this case, the electric crawler 1 spins and turns to the left on the spot.

On the other hand, when the traveling electric motor M1 is rotated, the rotational power (traveling power) of the traveling electric motor M1 is transmitted to the sun shaft 33 via the traveling power transmission unit Q. Note that the traveling power transmission unit Q is configured to include a plurality of gears, a belt, and the like. Here, if the turning electric motor M2 is stopped in advance, for example, the rotation of the ring gears 36 on both the left and right sides is stopped and is brought into a fixed state. Therefore, the traveling power transmitted to the sun shaft 33 is equally transmitted to the left-side drive shaft 6*a* and the right-side drive shaft 6*b* via the left and right planetary transmission mechanisms 31 (the sun gears 35, the planetary gears 34, and the planetary carriers 32). As a result, the left and right drive sprockets 6 rotate in the same rotational direction at the same rotational speed, and the electric crawler 1 travels. That is, the electric crawler 1 moves forward or backward in accordance with the rotational direction of the traveling electric motor M1.

On the basis of the aforementioned principle, the rotational speeds and rotational directions of the traveling electric motor M1 and the turning electric motor M2 are combined and controlled as appropriate, whereby the electric crawler 1 can be turned while traveling. Note that the rotational speed and the rotational direction of the traveling electric motor M1 can be adjusted by an accelerator pedal and a lever for switching forward/backward traveling of the steering unit 14 (see FIG. 1, FIG. 2). Further, the rotational speed and the rotational direction of the turning electric motor M2 can be adjusted by the rotational direction and a rotational angle of the steering wheel 15 (see FIG. 1, FIG. 2).

3. Configuration of Control System of Electric Crawler

Figure 6:
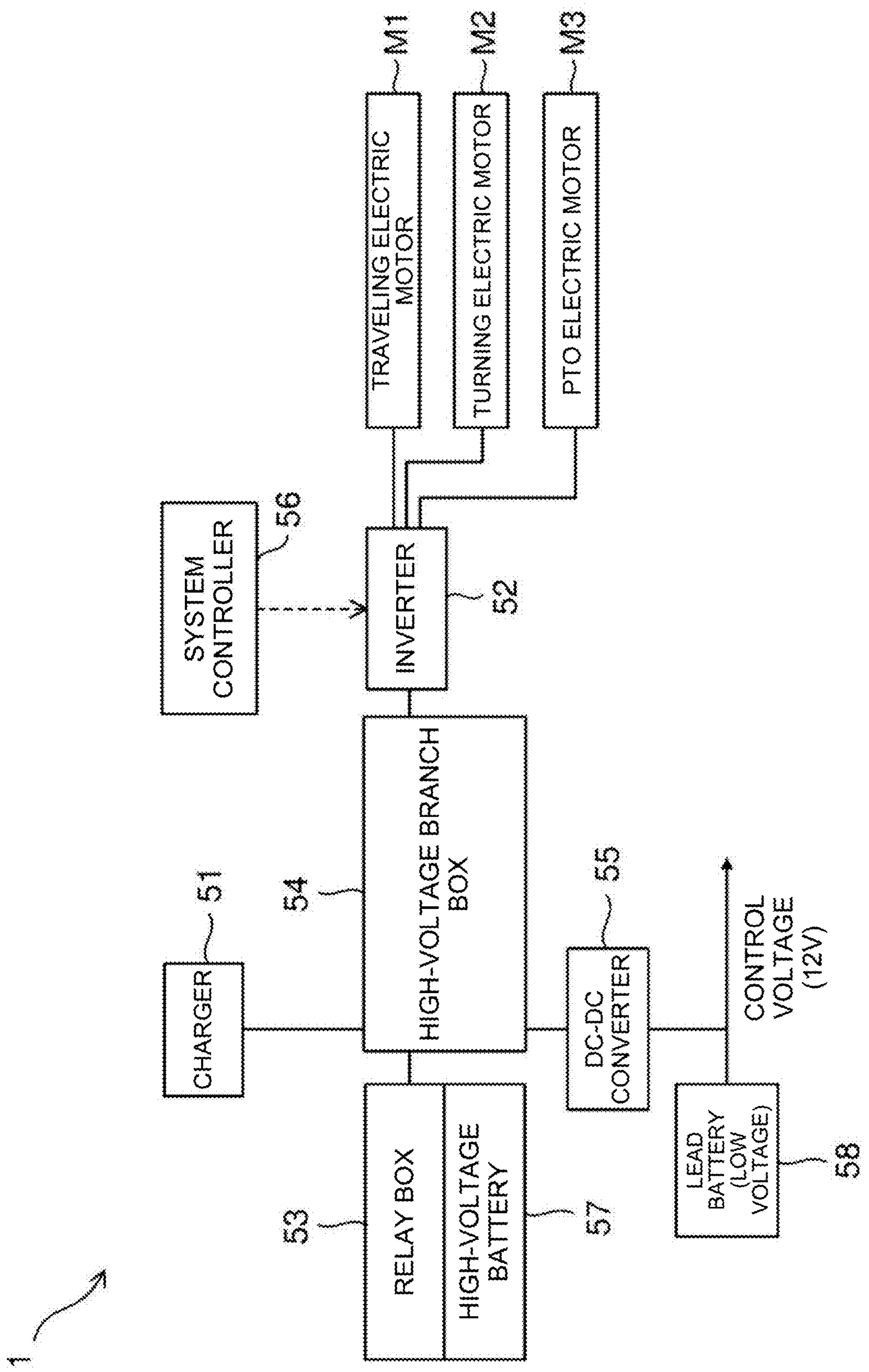
FIG. 6 is a block diagram schematically illustrating a configuration of a control system of the aforementioned electric crawler.

Subsequently, a configuration of a control system of the electric crawler 1 will be described. FIG. 6 is a block diagram schematically illustrating a configuration of the control system of the electric crawler 1. Note that, in FIG. 6, a solid line indicates a power supply path, and a broken line indicates a signal path. The electric crawler 1 includes a charger 51, an inverter 52, a relay box 53, a high-voltage branch box 54, a DC-DC converter 55, a system controller 56, a high-voltage battery 57, and a lead battery (12V battery) 58, in addition to the traveling electric motor M1, the turning electric motor M2, and the PTO electric motor M3 described above. The system controller 56 is constituted by an electronic control unit, also referred to as an Electronic Control Unit (ECU), and executes electrical control of each part of the electric crawler 1. The high-voltage battery 57 corresponds to the battery unit 13 shown in FIGS. 1 and 2.

The traveling electric motor M1, the turning electric motor M2, and the PTO electric motor M3 (hereinafter, also referred to as the traveling electric motor M1 and the like) are driven by electric power supplied from the high-voltage battery 57 via the relay box 53, the high-voltage branch box 54, and the inverter 52.

The charger 51 (also referred to as a power feeder) converts an AC voltage supplied from a commercial power supply (not shown) via a power feeding cable into a DC voltage. The inverter 52 converts a DC voltage supplied from the high-voltage battery 57 into an AC voltage and supplies it to the traveling electric motor M1 and the like. As a result, the traveling electric motor M1 and the like are rotated. The supply of the AC voltage (current) from the inverter 52 to the traveling electric motor M1 and the like is performed on the basis of a rotation command (command value) output from the system controller 56.

The relay box 53 is a battery control unit that configured to include a battery relay and a fuse, and controls the battery relay so as to control an input and an output of the high-voltage battery 57. The high-voltage branch box 54 is configured to include a charger relay, an inverter relay, a fuse, and the like. The voltage output from the aforementioned charger 51 is supplied to the high-voltage battery 57 via the high-voltage branch box 54 and the relay box 53. As a result, the high-voltage battery 57 can be charged. The voltage output from the high-voltage battery 57 is supplied to the inverter 52 via the relay box 53 and the high-voltage branch box 54.

The DC-DC converter 55 steps down a direct-current voltage of a high voltage (for example, 300V) supplied from the high-voltage battery 57 via the high-voltage branch box 54 to a low voltage (for example, 12V). The voltage output from the DC-DC converter 55 is supplied to the system controller 56 or the like in the same manner as the output from the lead battery 58.

4. Disposition of Electric Motors

Figure 7:
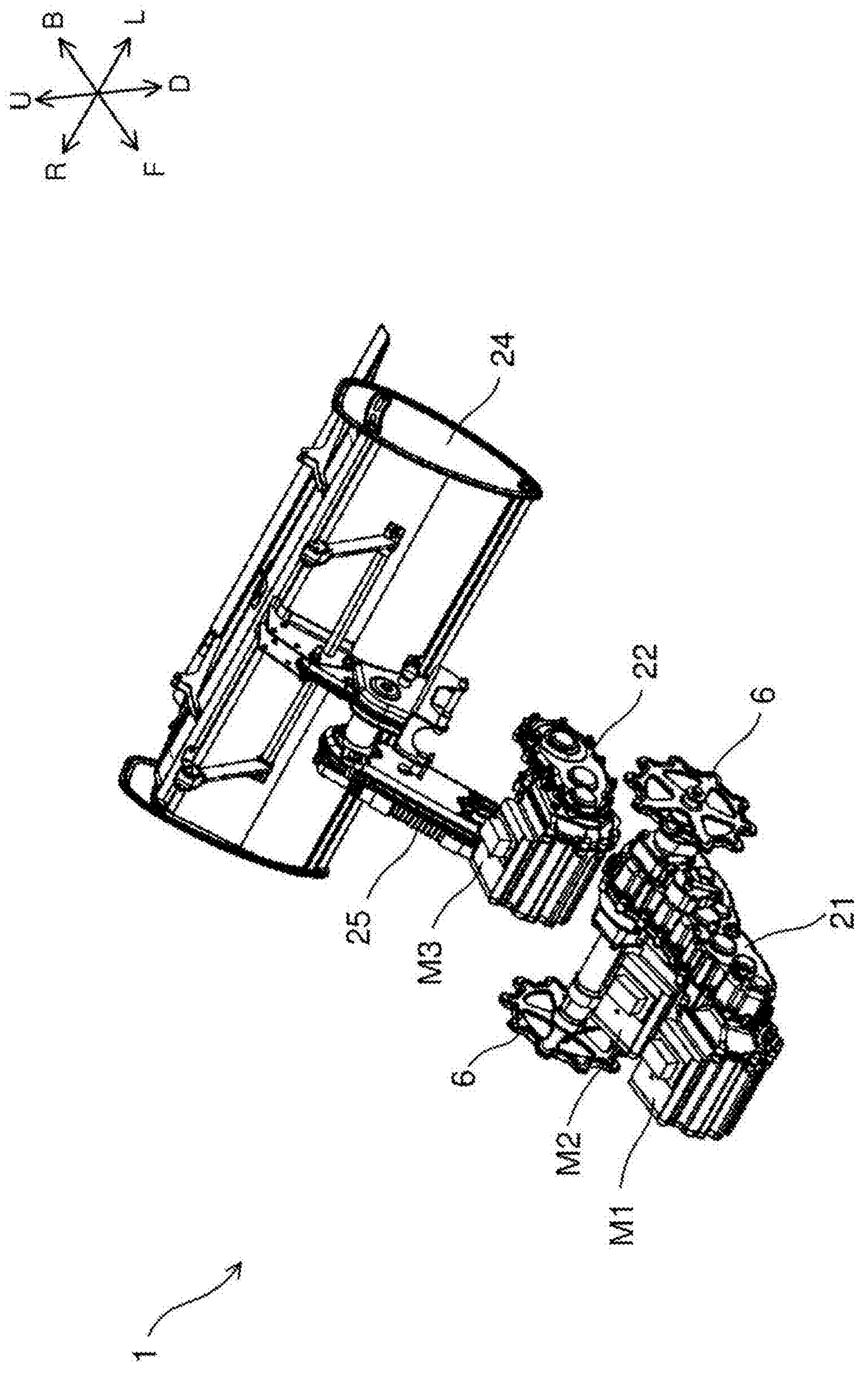
FIG. 7 is a perspective view illustrating a positional relation among a traveling electric motor, a turning electric motor, and a PTO electric motor in the aforementioned electric crawler.
Figure 8:
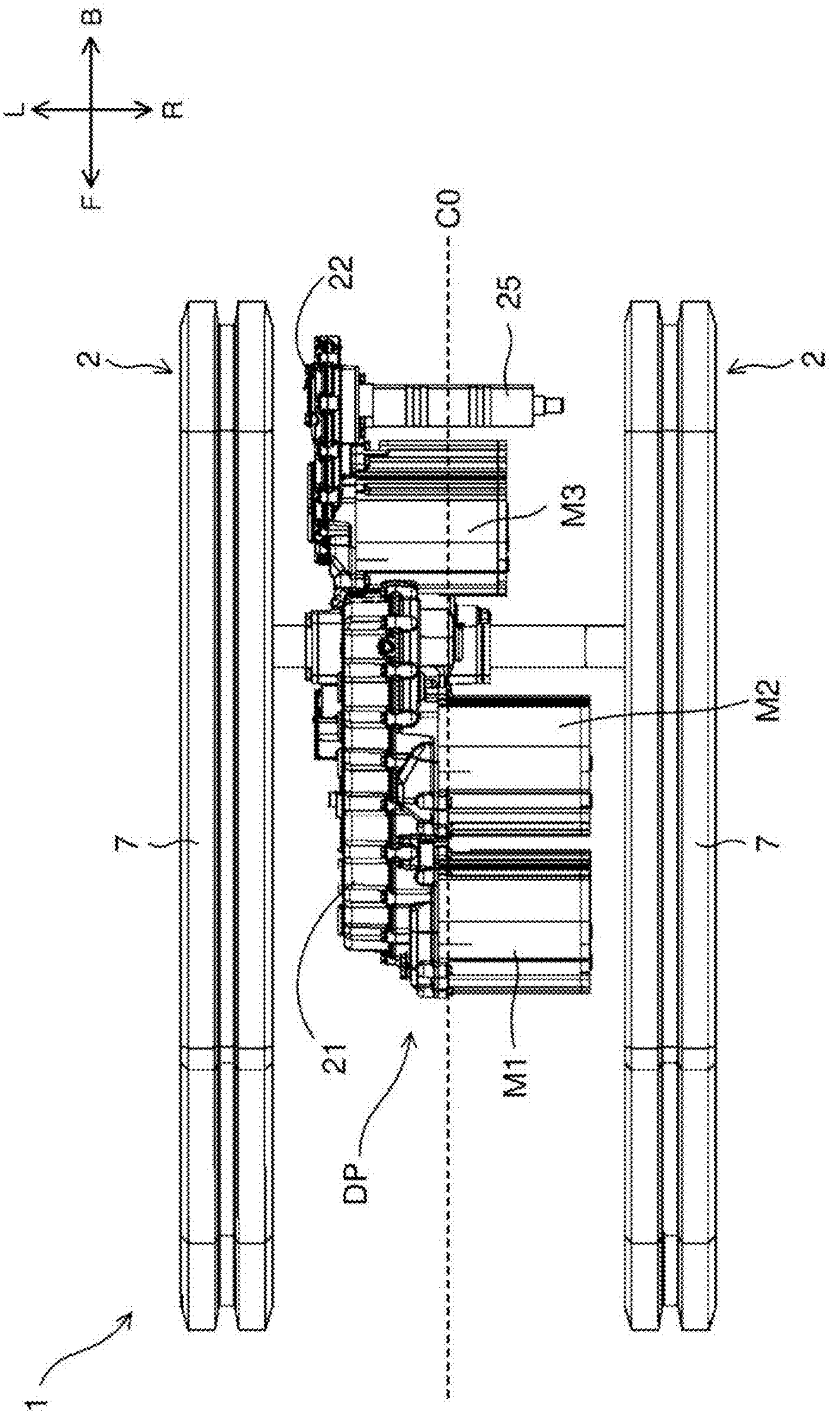
FIG. 8 is a bottom surface view of a major part of the aforementioned electric crawler.

FIG. 7 is a perspective view illustrating a positional relation among the traveling electric motor M1, the turning electric motor M2, and the PTO electric motor M3 in the electric crawler 1. FIG. 8 is a bottom surface view of a major part (including each electric motor) of the electric crawler 1. As shown in FIGS. 7 and 8, the traveling electric motor M1 and the turning electric motor M2 are disposed on one lateral side in the vehicle. To be more specific, the traveling electric motor M1 and the turning electric motor M2 are positioned with displacement to one lateral side (right side in FIG. 8)

from a center line CO in the vehicle width direction (left-right direction). The traveling electric motor M1 and the turning electric motor M2 are positioned side by side in a direction perpendicular to the vehicle width direction (the front-rear direction of the electric crawler 1). In this Embodiment, the traveling electric motor M1 and the turning electric motor M2 are positioned side by side in the front-rear direction of the vehicle.

With the disposition of the traveling electric motor M1 and the turning electric motor M2 as above, only the traveling crawler 2 disposed on one lateral side (right side in FIG. 8) of the left and right traveling crawlers 2 needs to be disassembled at the maintenance of the traveling electric motor M1 and the turning electric motor M2. For example, the crawler belt 7, the drive sprocket 6, and the like, which are constituent components of only the right-side traveling crawler 2 needs to be removed from the vehicle. As a result, both the traveling electric motor M1 and the turning electric motor M2 can be easily accessed from the same one lateral side (from one side). Further, when the traveling electric motor M1 and the turning electric motor M2 are to be assembled to the vehicle at the manufacture of the electric crawler 1, both the traveling electric motor M1 and the turning electric motor M2 can be assembled from the same one lateral side to the vehicle.

As described above, when the maintenance or assembling work of the traveling electric motor M1 and the turning electric motor M2 is to be performed, the maintenance or assembling can be performed by accessing from only one of the left and right sides. Therefore, it is possible to facilitate the works of maintenance of the plurality of electric motors and assembling to the vehicle as compared with a conventional configuration in which the traveling motors are disposed independently on the left and right sides, that is, a configuration in which the motors are disposed side by side in the left-right direction, which requires access from both the left and right sides.

Further, when the traveling electric motor M1, the turning electric motor M2, and the first speed reducer 21 are regarded as one drive portion DP (mechanism), as shown in FIG. 8, the dimension in the width direction of the drive portion DP is equal to the dimension in the axial direction of the traveling electric motor M1+the thickness of the first speed reducer 21 or the dimension in the axial direction of the turning electric motor M2+the thickness of the first speed reducer 21. That is, the electric motor contributing to the dimension in the width direction of the drive portion DP is either one of the traveling electric motor M1 and the turning electric motor M2. In other words, in the two electric motors, only one electric motor contributes to the dimension in the width direction of the drive portion DP. As a result, the drive portion DP becomes compact in the width direction. As a result, the degree of freedom in setting the inter-center dimension (tread) between the left and right traveling crawlers 2 is improved, and the number of works that can be handled can be increased.

Further, the traveling electric motor M1 and the turning electric motor M2 are disposed on one side (with displacement) with respect to the center line CO of the vehicle, the first speed reducer 21 is disposed on the other side (with displacement) with respect to the center line CO, and the traveling electric motor M1, the turning electric motor M2, and the first speed reducer 21 are assembled on the center line CO (or in the vicinity of the center line CO) of the vehicle. Therefore, it also becomes possible to bring the position of the center of gravity of the traveling electric motor M1, the turning electric motor M2, and the first speed reducer 21 in total closer to the center in the width direction of the vehicle. As a result, a weight balance in the width direction of the vehicle can be maintained favorably.

In this Embodiment, as shown in FIGS. 3, 4, 7, and 8, the traveling electric motor M1 and the turning electric motor M2 are assembled to the same first speed reducer 21. With this configuration, when the traveling electric motor M1 and the turning electric motor M2 are to be assembled to the vehicle, the traveling electric motor M1 and the turning electric motor M2 can be assembled to the vehicle in a state where the traveling electric motor M1 and the turning electric motor M2 are assembled to the first speed reducer 21. That is, the traveling electric motor M1, the turning electric motor M2, and the first speed reducer 21 can be assembled as one set to the vehicle from one lateral side at the same time.

Therefore, from the viewpoint of improving workability (work efficiency) at the assembling of the traveling electric motor M1, the turning electric motor M2, and the first speed reducer 21, it is desirable that the electric crawler 1 of this Embodiment includes a single first speed reducer 21 to which the traveling electric motor M1 and the turning electric motor M2 are assembled.

Further, as shown in FIGS. 3, 4, 7, and 8, the traveling electric motor M1 and the turning electric motor M2 are disposed and assembled on the right side of the first speed reducer 21. In this case, at the maintenance of the traveling electric motor M1 and the turning electric motor M2, by removing some components (the right-side crawler belt 7, the drive sprocket 6, and the like) of the right-side traveling crawler 2 from the vehicle, it becomes possible to access both the traveling electric motor M1 and the turning electric motor M2 without being hindered by the first speed reducer 21 and perform a maintenance work.

As described above, from the viewpoint of avoiding hindrance to an access from the one lateral side to the traveling electric motor M1 and the turning electric motor M2 by the first speed reducer 21, it is desirable that the traveling electric motor M1 and the turning electric motor M2 are disposed on one lateral side with respect to the first speed reducer 21.

Since the traveling electric motor M1 and the turning electric motor M2 are heavy objects, it is desirable that they are disposed at low positions in the vehicle in order to lower the center of gravity of the vehicle and to improve traveling stability. In this Embodiment, as shown in FIG. 1, the electric crawler 1 includes the driver's seat 11 on which an operator is seated. The first speed reducer 21 described above is disposed below the driver's seat 11. In this case, the heavy objects assembled to the first speed reducer 21, that is, the traveling electric motor M1 and the turning electric motor M2 can be disposed below the driver's seat 11 together with the first speed reducer 21 so as to lower the center of gravity of the vehicle. Therefore, it is advantageous in improvement of the traveling stability of the vehicle.

As shown in FIGS. 7 and 8, the PTO electric motor M3 is assembled to a second speed reducer 22 as a PTO speed reducer. The second speed reducer 22 is disposed at a rear upper part of the first speed reducer 21. When the PTO electric motor M3 is assembled to the vehicle, it is desirable from the viewpoint of workability that the PTO electric motor M3 can be assembled to the vehicle from one lateral side (for example, the right side) of the vehicle in a state where the PTO electric motor M3 is assembled to the second speed reducer 22 in the same manner as when the traveling electric motor M1 and the turning electric motor M2 are assembled to the vehicle. That is, it is desirable that the PTO electric motor M3 and the second speed reducer 22 are assembled as one set so that they can be assembled to the vehicle from one lateral side at the same time.

As described above, from the viewpoint of improving workability (work efficiency) at the assembling of the PTO electric motor M3 and the second speed reducer 22, it is desirable that the electric crawler 1 of this Embodiment includes the PTO electric motor M3 and the second speed reducer 22 (PTO speed reducer) to which the PTO electric motor M3 is assembled.

Further, as shown in FIGS. 7 and 8, the PTO electric motor M3 is disposed and assembled on the right side with respect to the second speed reducer 22. In this case, at the maintenance of the PTO electric motor M3, by removing some components (the right-side crawler belt 7, the drive sprocket 6, and the like) of the right-side traveling crawler 2 from the vehicle, it becomes possible to access the PTO electric motor M3 without being hindered by the second speed reducer 22 and to perform maintenance work.

As described above, from the viewpoint of avoiding hindrance to an access from the one lateral side to the PTO electric motor M3 by the second speed reducer 22, it is desirable that the PTO electric motor M3 is disposed on one lateral side with respect to the second speed reducer 22.

In particular, the electric crawler 1 of this Embodiment has such a configuration that the traveling electric motor M1 and the turning electric motor M2 are disposed on one lateral side with respect to the first speed reducer 21, and the PTO electric motor M3 is disposed on the same one lateral side with respect to the second speed reducer 22 (positioned behind the first speed reducer 21). With this configuration, by removing some components of the traveling crawler 2 disposed on the one lateral side from the vehicle, it becomes possible to access all of the traveling electric motor M1, the turning electric motor M2, and the PTO electric motor M3 from the same one lateral side without being hindered by the first speed reducer 21 and the second speed reducer 22 and to perform the maintenance work. Therefore, also from the viewpoint of preventing access to all the electric motors from being hindered by the first speed reducer 21 and the second speed reducer 22, it is desirable that the PTO electric motor M3 is disposed on one lateral side with respect to the second speed reducer 22, that is, it is disposed on the same side as that on which the traveling electric motor M1 and the turning electric motor M2 are disposed with respect to the first speed reducer 21.

Further, from the viewpoint of making the weight balance of the vehicle favorable, it is desirable that the three electric motors, which are heavy objects, that is, the traveling electric motor M1, the turning electric motor M2, and the PTO electric motor M3 are disposed together in a compact manner. In this Embodiment, as shown in FIGS. 7 and 8, the PTO electric motor M3 is disposed in the vicinity of (for example, at a position close to the rear of) the traveling electric motor M1 and the turning electric motor M2. As a result, a compact layout of heavy objects is realized, and the weight balance of the vehicle is improved.

Further, in order to efficiently transmit the power generated by the PTO electric motor M3 to the work machine 24 through a short power transmission path (for example, with a small number of gears), it is desirable to dispose the PTO electric motor M3 at a position close to the work machine 24 attached to the rear of the vehicle. In this regard, as shown in FIG. 7, if the PTO electric motor M3 is disposed on the rear of the traveling electric motor M1 and the turning electric motor M2, the PTO electric motor M3 can be disposed at a position close to the front of the work machine 24. Thus, the power of the PTO electric motor M3 can be efficiently transmitted to the work machine 24 via the second speed reducer 22 and the PTO power transmission unit 25. Therefore, in this regard, it is desirable that the PTO electric motor M3 is disposed on the rear of the traveling electric motor M1 and the turning electric motor M2.

In the above, an example in which the traveling electric motor M1 and the turning electric motor M2 are positioned with displacement to the right side from the center in the width direction of the vehicle has been explained, but they may be positioned with displacement to the left side from the center in the width direction. In this case, by replacing the term "one lateral side" described in this Embodiment with the left side and disposing each member, the electric crawler 1 that exerts the effects of this Embodiment can be realized.

In the above, an example in which the traveling electric motor M1 and the turning electric motor M2 are positioned side by side in the front-rear direction of the vehicle between the left and right traveling crawlers 2 has been explained, but they may be positioned side by side in the up-down direction. In this case, although there is a possibility that the position of the center of gravity of the heavy objects (the traveling electric motor M1, the turning electric motor M2, and the PTO electric motor M3) in total becomes high, it is possible to obtain such advantages that the heavy objects are disposed together in a compact manner so as to promote size reduction of the vehicle and that the redundant configuration for traveling and turning is omitted (the number of gears is reduced), whereby the configuration of the first speed reducer 21 is simplified. Therefore, in this Embodiment, it can be said that the traveling electric motor M1 and the turning electric motor M2 only need to be disposed side by side in the direction perpendicular to the width direction of the vehicle.

5. Supplement

In this Embodiment, a case where the electric crawler 1 is of a type in which the crawler belt 7 is wound around one drive wheel (drive sprocket) and two driven wheels (idlers) in a triangular shape has been explained, but it may be of a type in which the crawler belt 7 is wound around one drive wheel and one driven wheel aligned in the front-rear direction.

In this Embodiment, a case where the electric crawler 1 is a crawler-type tractor was explained, but the configuration of this Embodiment can also be applied to other crawler vehicles such as snowplows.

6. Appendix

The electric crawler 1 described in this Embodiment can also be expressed as an electric crawler vehicle described in the following supplements.

The electric crawler vehicle of Appendix (1) includes
- a pair of left and right traveling crawlers,
- a traveling electric motor that generates traveling power to be transmitted to the pair of left and right traveling crawlers,
- a turning electric motor that generates turning power to be transmitted to the pair of left and right traveling crawlers, in which
- the traveling electric motor and the turning electric motor are disposed on one lateral side of the vehicle.

The electric crawler vehicle of Appendix (2) further includes, in the electric crawler vehicle described in Appendix (1),
- a single speed reducer to which the traveling electric motor and the turning electric motor are assembled.

The electric crawler vehicle of Appendix (3) is configured such that, in the electric crawler vehicle described in Appendix (2), the traveling electric motor and the turning electric motor are disposed on the one lateral side with respect to the speed reducer.

The electric crawler vehicle of Appendix (4) further includes, in the electric crawler vehicle described in Appendix (2) or (3), a driver's seat on which an operator is seated, in which the speed reducer is disposed below the driver's seat.

The electric crawler vehicle of Appendix (5) further includes, in the electric crawler vehicle described in any one of Appendices (2) to (4), a PTO electric motor that generates PTO power for driving a work machine, in which when the speed reducer is assumed to be a first speed reducer, a PTO speed reducer to which the PTO electric motor is assembled is further provided as a second speed reducer.

The electric crawler vehicle of Appendix (6) is configured such that, in the electric crawler vehicle described in Appendix (5), the PTO electric motor is disposed on the one lateral side with respect to the second speed reducer.

The electric crawler vehicle of Appendix (7) is configured such that, in the electric crawler vehicle described in Appendices (5) or (6), the PTO electric motor is disposed in the vicinity of the traveling electric motor and the turning electric motor.

The electric crawler vehicle of Appendix (8) is configured such that, in the electric crawler vehicle described in any one of Appendices (5) to (7), the PTO electric motor is disposed on the rear of the traveling electric motor and the turning electric motor.

The electric crawler vehicle of Appendix (9) is configured such that, in the electric crawler vehicle described in any one of Appendices (1) to (8), the traveling electric motor and the turning electric motor are disposed side by side in a direction perpendicular to a width direction of the vehicle.

Although the Embodiment of the present invention has been described above, a scope of the present invention is not limited thereto, and the present invention can be implemented by being expanded or changed within a range not departing from the gist of the invention.

INDUSTRIAL APPLICABILITY

The present invention is applicable to a crawler vehicle used as a work machine such as an agricultural machine and a construction machine.

REFERENCE SIGNS LIST

1 Electric crawler (electric crawler vehicle)
2 Traveling crawler
11 Driver's seat
21 First speed reducer
22 Second speed reducer
24 Work machine
M1 Traveling electric motor
M2 Turning electric motor
M3 PTO electric motor

The invention claimed is:

1. An electric crawler vehicle, comprising:

a pair of left and right traveling crawlers;

a traveling electric motor that generates traveling power to be transmitted to the pair of left and right traveling crawlers;

a turning electric motor that generates turning power to be transmitted to the pair of left and right traveling crawlers;

a first speed reducer to which the traveling electric motor and the turning electric motor are assembled;

a power take off (PTO) electric motor that generates PTO power for driving a work machine;

a second speed reducer, wherein the second speed reducer is a PTO speed reducer to which the PTO electric motor is assembled; and a work machine, wherein the PTO electric motor is disposed between the work machine and each of the traveling electric motor and the turning electric motor, wherein the traveling electric motor and the turning electric motor are disposed on one lateral side of the electric crawler vehicle, and wherein the traveling electric motor and the turning electric motor are adjacent one another in a direction perpendicular to a width direction of the electric crawler vehicle.

2. The electric crawler vehicle according to claim 1, wherein the traveling electric motor and the turning electric motor are disposed on the one lateral side with respect to the first speed reducer.

3. The electric crawler vehicle according to claim 1, further comprising a driver's seat on which an operator is seated, wherein the first speed reducer is disposed below the driver's seat.

4. The electric crawler vehicle according to claim 1, wherein the PTO electric motor is disposed on the one lateral side with respect to the second speed reducer.

5. The electric crawler vehicle according to claim 1, wherein the PTO electric motor is disposed on a rear of the traveling electric motor and the turning electric motor.

* * * * *